(12) United States Patent
Malecki et al.

(10) Patent No.: US 9,733,996 B1
(45) Date of Patent: Aug. 15, 2017

(54) FINE TUNING APPLICATION BEHAVIOR USING APPLICATION ZONES

(71) Applicant: International Business Machines Corporation, Armonk, NY (US)

(72) Inventors: Bartlomiej T. Malecki, Slomniki (PL); Piotr Padkowski, Lodz (PL); Marek Peszt, Krakow (PL); Piotr J. Walczak, Krakow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/141,606

(22) Filed: Apr. 28, 2016

(51) Int. Cl.
*G06F 9/46* (2006.01)
*G06F 9/54* (2006.01)
*G06F 9/48* (2006.01)
*G06F 11/34* (2006.01)
*G06F 11/30* (2006.01)

(52) U.S. Cl.
CPC ............ *G06F 9/542* (2013.01); *G06F 9/4881* (2013.01); *G06F 11/302* (2013.01); *G06F 11/3409* (2013.01)

(58) Field of Classification Search
CPC .............................. G06F 9/4843; G06F 9/4881
USPC ................................................. 718/100, 102
See application file for complete search history.

(56) References Cited

U.S. PATENT DOCUMENTS

| | | | |
|---|---|---|---|
| 6,308,163 B1 | 10/2001 | Du et al. | |
| 7,398,284 B2 | 7/2008 | Sterling et al. | |
| 7,430,741 B2 | 9/2008 | Ayachitula et al. | |
| 7,711,822 B1 * | 5/2010 | Duvur | G06F 9/5005 709/224 |
| 7,734,693 B2 | 6/2010 | Ardulov | |
| 8,121,973 B2 | 2/2012 | Anderson et al. | |
| 8,677,360 B2 * | 3/2014 | de Justo Teixeira | G06F 11/3476 718/100 |
| 9,054,962 B2 | 6/2015 | Hitoma et al. | |
| 2006/0123217 A1 | 6/2006 | Burdick et al. | |
| 2011/0161961 A1 * | 6/2011 | Fu | G06F 9/5027 718/102 |
| 2013/0232254 A1 | 9/2013 | Srikanth et al. | |

FOREIGN PATENT DOCUMENTS

WO  WO2008007382 A2  1/2008
WO  WO2012022835 A2  2/2012

OTHER PUBLICATIONS

"WebSphere Application Server Performance Tuning Toolkit," IBM developerWorks WebSphere Editorial Team, Dec. 12, 2011, 12 pages. http://www.ibm.com/developerworks/websphere/downloads/performtuning.html.

(Continued)

*Primary Examiner* — Andy Ho
(74) *Attorney, Agent, or Firm* — Yee & Associates, P.C.; Jeffrey LaBaw

(57) ABSTRACT

Managing an application zone is provided. A request is received from a program on a client device to enter a zone of an application that provides a service. In response to determining that the zone does not currently exist in the application, the zone is generated in the application based on defined parameters of the zone. An enter notification is sent to the program on the client device indicating that the zone is ready for the program to enter to receive the service.

24 Claims, 5 Drawing Sheets

(56) References Cited

OTHER PUBLICATIONS

Ryoo et al., "Optimization Principles and Application Performance Evaluation of a Multithreaded GPU Using CUDA," Proceedings of the 13th ACM SIGPLAN Symposium on Principles and Practice of Parallel Programming (PPoPP '08), Feb. 2008, pp. 73-82.

\* cited by examiner

FINE TUNING APPLICATION BEHAVIOR USING APPLICATION ZONES

BACKGROUND

1. Field

The disclosure relates generally to fine tuning behavior of an application and more specifically to fine tuning the behavior of the application using a set of zones within the application. Still more specifically, the disclosure relates to allowing special and configurable treatment of the application by an operating system via a set of rules corresponding to each zone in the set of zones within the application during a portion of a lifetime of the application.

2. Description of the Related Art

A thread of execution is the smallest sequence of programmed instructions that can be managed independently by a scheduler, which is typically a part of the operating system. In most cases, a thread is a component of a process. A process is an instance of a software application that is being executed. A software application is a collection of instructions and a process executes those instructions. Multiple threads can exist within one process, execute concurrently (e.g., one thread starting before other threads finish), and share resources such as memory, while different processes do not share these resources. In particular, the threads of a process share its instructions and its context.

Multithreading on a single processor is generally implemented using time slicing and the processor switches between different threads. This context switching generally happens often enough that users perceive the threads as running at the same time. On a multiprocessor or multi-core system, multiple threads can be executed in parallel, with each processor or core executing a separate thread simultaneously.

Applications that use multithreading are more responsive to user input because the user interface stays active as processor-intensive tasks execute on separate threads. Multithreading also is useful in scalable applications because threads may be added as the workload increases. However, multiple threads can interfere with each other when sharing hardware resources, such as caches or buffers. As a result, execution times of a thread are not improved and may be degraded.

SUMMARY

According to one illustrative embodiment, a computer-implemented method for managing an application zone is provided. A computer receives a request from a program on a client device to enter a zone of an application that provides a service. In response to the computer determining that the zone does not currently exist in the application, the computer generates the zone in the application based on defined parameters of the zone. The computer sends an enter notification to the program on the client device indicating that the zone is ready for the program to enter to receive the service. According to other illustrative embodiments, a computer system and computer program product for managing an application zone are provided.

DETAILED DESCRIPTION

Figure 1:
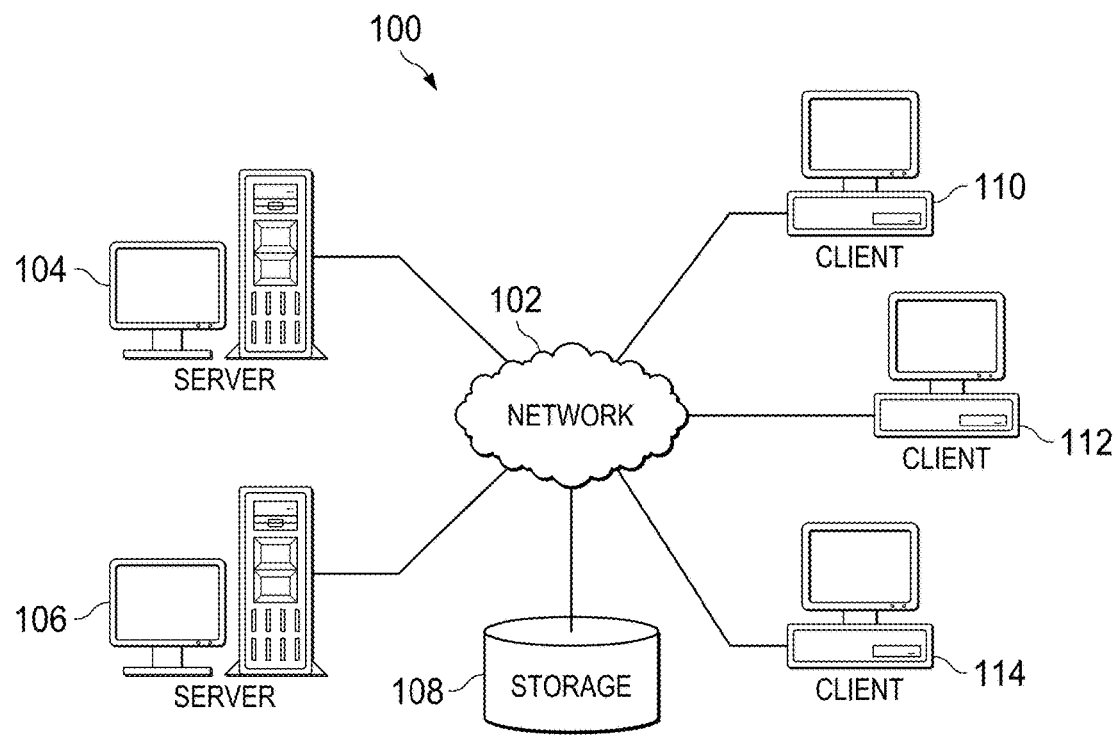
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
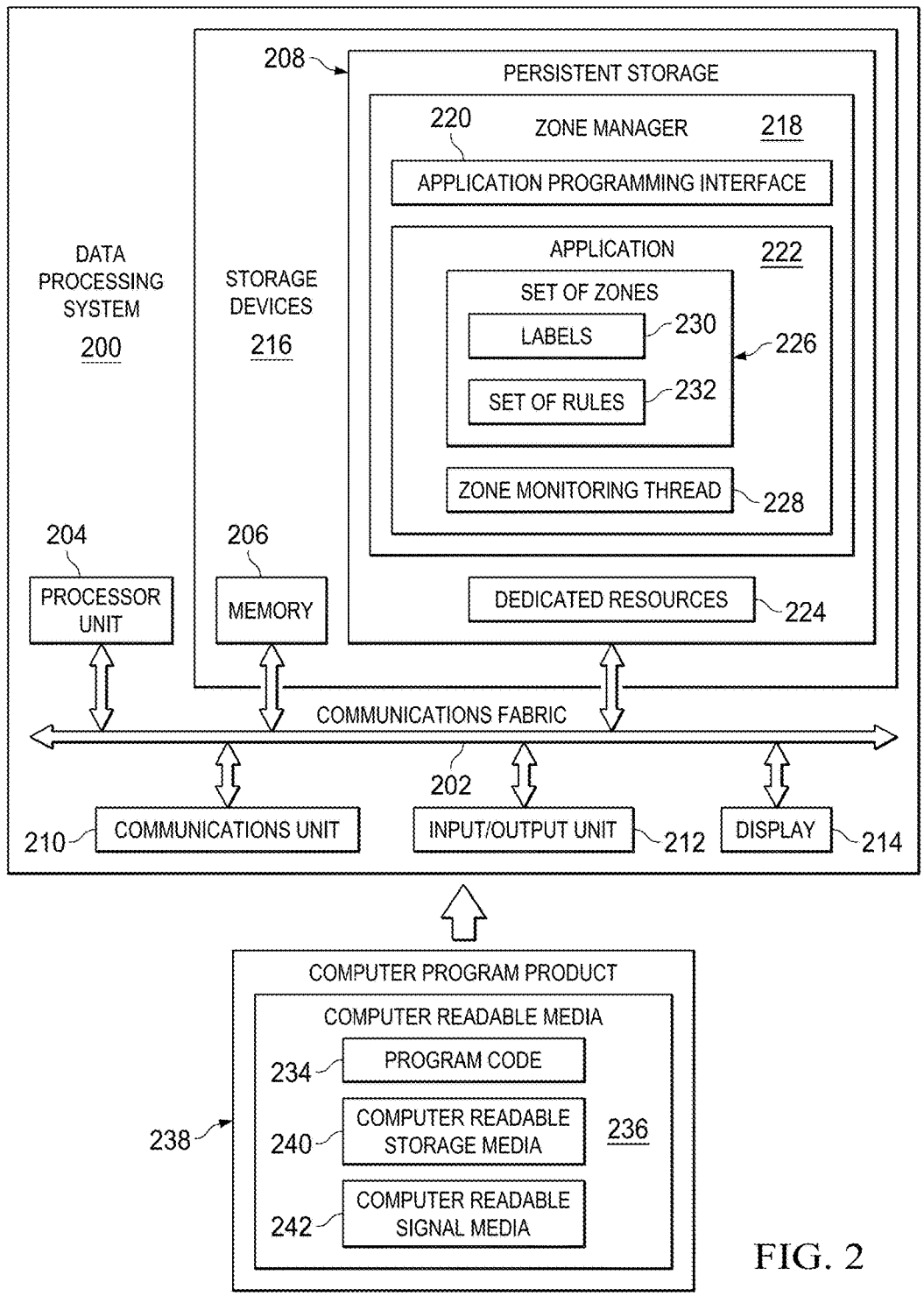
FIG. 2 is a diagram of a data processing system in which illustrative embodiments may be implemented.
Figure 3:
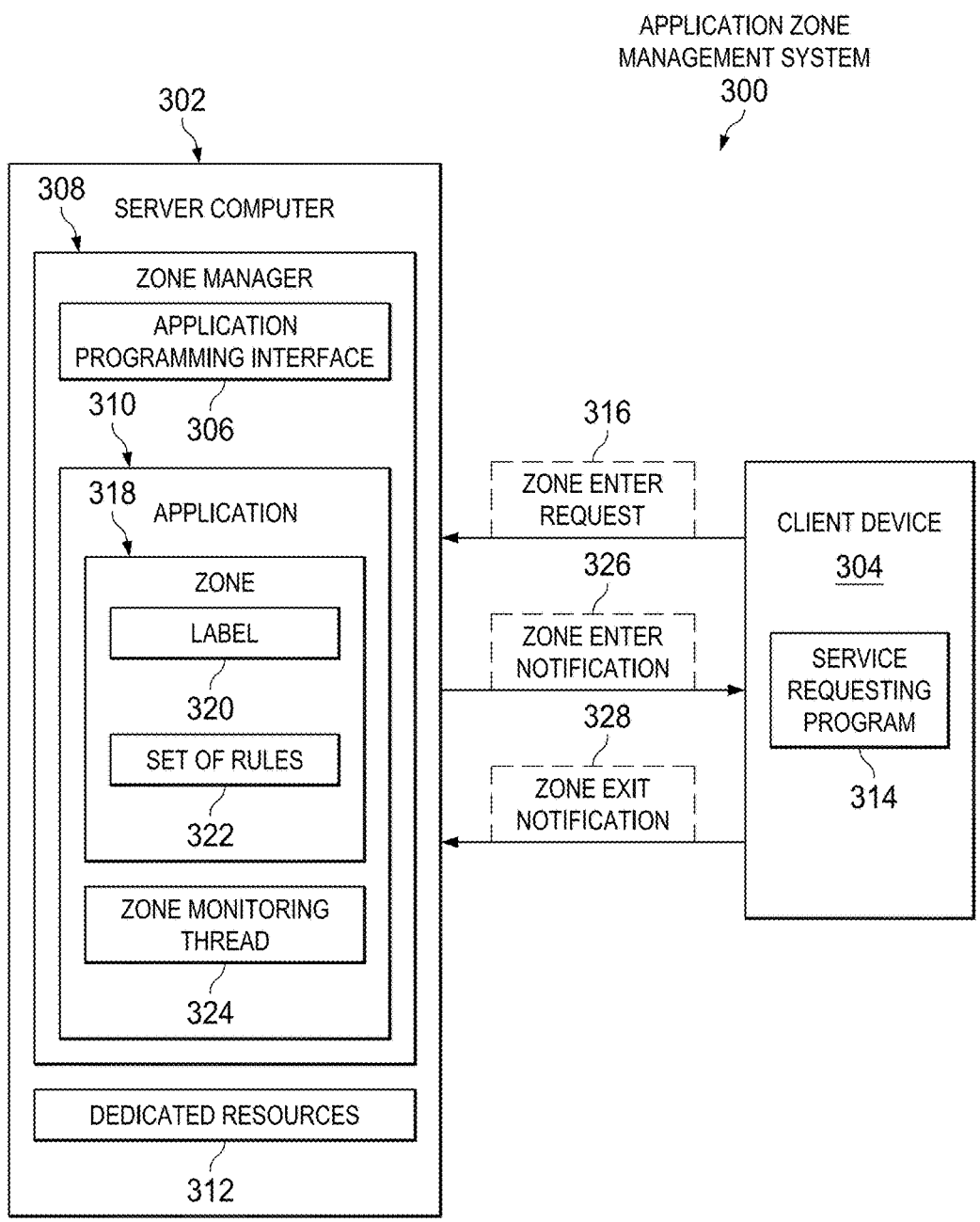
FIG. 3 is a diagram illustrating an example of an application zone management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to registered software programs in client devices. The set of services may include data import services or sensitive data decryption services, for example.

Client 110, client 112, and client 114 also connect to network 102. Clients 110, 112, and 114 are clients of server 104 and server 106. Server 104 and server 106 may provide information, such as boot files, operating system images, and software programs to clients 110, 112, and 114.

In this example, clients 110, 112, and 114 are illustrated as desktop computers, which may have wire or wireless communication links to network 102. However, it should be noted that clients 110, 112, and 114 are intended as examples only. In other words, clients 110, 112, and 114 also may include other devices, such as, for example, network computers, laptop computers, handheld computers, smart phones, smart watches, personal digital assistants, gaming devices, kiosks, set-top boxes, or any combination thereof. Users of clients 110, 112, and 114 may utilize clients 110, 112, and 114 to access the set of services provided by server 104 or server 106 to registered software programs in clients 110, 112, and 114.

Storage 108 is a network storage device capable of storing any type of data in a structured format or an unstructured format. In addition, storage 108 may represent a set of one or more network storage devices. Storage 108 may store, for example, names and identification numbers for a plurality of different users of the set of services, user profile information, registered software programs, application programming interfaces, application zone managers, applications having a set of zones with rules, and the like. Further, storage 108 may store other data, such as authentication or credential data that may include user names, passwords, and biometric data associated with the plurality of different users and system administrators, for example.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores zone manager 218. Zone manager 218 fine tunes behavior of service applications located in data processing system 200 by managing a set of one or more zones inserted within each of the service applications. As a result, zone manager 218 allows special and configurable treatment of the service applications by an operating system of data processing system 200 via a set of rules corresponding to each zone in the set of zones within the service applications. The special and configurable treatment does not cover the whole lifetime of a service application, but only a portion of the whole lifetime. The portion of the lifetime of the service application is defined in the service application allowing special rules for certain functionalities. For example, the service application may read confidential data, and during the reading process, the confidential data is potentially exposed to attack by malicious programs or users. In this case, the service application notifies zone manager 218 regarding the starting and stopping of the reading of the confidential data and the operating system may prepare data processing system 200 for the risk to the confidential data by, for example, disallowing remote connections, terminating unrecognized processes, and the like. It should be noted that even though zone manager 218 is illustrated as residing in persistent storage 208, in an alternative illustrative embodiment zone manager 218 may be a separate component of data processing system 200. For example, zone manager 218 may be a hardware component coupled to communication fabric 202 or a combination of hardware and software components. Alternatively, zone manager 218 may be included as part of an operating system of data processing system 200.

Also in this example, persistent storage 208 stores application programming interface 220, application 222, and dedicated resources 224. Application programming interface 220 is program code that allows application 222 to communicate with other software programs, such as service requesting programs. In other words, application program interface 220 is a software-to-software interface. A service requesting program uses application program interface 220, which is defined for application 222, to communicate with application 222 to receive a requested service. It should be noted that application program interface 220 may represent a plurality of different application program interfaces.

Data processing system 200 utilizes application 222 to provide a set of one or more services, such as, for example, sensitive data decryption and data importing services, to requesting programs located in clients. Application 222 may be, for example, a multi-threaded application capable of executing multiple tasks simultaneously in parallel (i.e., at a same time). In addition, application 222 may represent a plurality of different service applications located on data processing system 200.

In this example, application 222 includes set of zones 226 and zone monitoring thread 228. Data processing system 200 generates set of zones 226 in application 222 based on zone definitions. The zone definitions may be created by a software developer of application 222, for example. Set of zones 226 may be a set of one or more zones. A zone in set of zones 226 performs a particular task corresponding to the service provided by application 222. Each zone in set of zones 226 may perform a same task or may perform a different task.

In this example, set of zones 226 include labels 230 and set of rules 232. Labels 230 identify each zone in set of zones 226. In other words, each zone in set of zones 226 has a corresponding label for unique identification. However, it should be noted that alternative illustrative embodiments may utilize other zone identifiers, such as, for example, unique identification numbers. A service requesting program knows labels 230 of set of zones 226. As a result, a service requesting program is able to request entrance into a particular zone of set of zones 226 in application 222 to have a particular task associated with the service performed by that particular zone.

Application 222 utilizes zone monitoring thread 228 to enforce set of rules 232 on each respective zone in set of zones 226. Set of rules 232 may, for example, limit a total number of service requesting programs that may enter a particular zone and guarantee availability of dedicated resources 224 to service requesting programs that entered that particular zone. Dedicated resources 224 represent a list of a plurality of different resources, such as, for example, memory resources, storage resources, processor resources, network resources, communication device resources, and the like, which are dedicated to the different zones to perform tasks corresponding to the service. A portion or all of dedicated resources 224 may be located in data processing system 200. Alternatively, a portion or all of dedicated resources 224 may be remotely distributed in a network of data processing systems, such as network data processing system 100 in FIG. 1. Set of zones 226 utilize dedicated resources 224 to perform their respective tasks corresponding to the service requested by the program.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 234 is located in a functional form on computer readable media 236 that is selectively removable and may be loaded onto or transferred to data processing system 200 for running by processor unit 204. Program code 234 and computer readable media 236 form computer program product 238. In one example, computer readable media 236 may be computer readable storage media 240 or computer readable signal media 242. Computer readable storage media 240 may include, for example, an optical or magnetic disc that is inserted or placed into a drive or other device that is part of persistent storage 208 for transfer onto a storage device, such as a hard drive, that is part of persistent storage 208. Computer readable storage media 240 also may take the form of a persistent storage, such as a hard drive, a thumb drive, or a flash memory that is connected to data processing system 200. In some instances, computer readable storage media 240 may not be removable from data processing system 200.

Alternatively, program code 234 may be transferred to data processing system 200 using computer readable signal media 242. Computer readable signal media 242 may be, for example, a propagated data signal containing program code 234. For example, computer readable signal media 242 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 234 may be downloaded over a network to persistent storage 208 from another device or data processing system through computer readable signal media 242 for use within data processing system 200. For instance, program code stored in a computer readable storage media in a data processing system may be downloaded over a network from the data processing system to data processing system 200. The data processing system providing program code 234 may be a server computer, a client computer, or some other device capable of storing and transmitting program code 234.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 240 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that many network service applications on servers have problems with performance. For example, multithreading dependencies may make an application hard to maintain and deadlocks between threads may appear during the application's life time. Increasing performance of a multi-threaded application, which may use different components, such as operating system, application container, network, and database components, may be difficult because processing every single service request from a plurality of client programs may not be possible. In addition, fine tuning application performance on an entire distributed system may be impossible. Also, it is hard to ensure that dedicated resources for the multi-threaded application will be maintained and if memory doesn't allow running of all desired multi-threaded applications, then one or more of the desired multi-threaded applications will be closed.

Illustrative embodiments are able to control application usage by the requesting programs and tune the applications to work more efficiently by inserting zones into applications. An application may comprise a set of one or more zones and both the set of zones and other components of the application may interact in complex ways. Each application zone includes a label, which uniquely identifies the zone. In addition, a zone label may be referenced on multiple levels, such as, for example, on an application level, application container level, operating system level, network level, and database level.

Each zone may have a predefined set of corresponding rules. Further, each zone may include a different set of rules for each level of the multiple levels that references an application zone. A user, via a user interface, such as a graphical user interface, may interact with the set of rules. For example, the user may edit the set of rules, select priorities for the set of rules, and set a strategy, such as a merge not conflicting setting versus an ignore not mentioned setting, for the set of rules.

Zone rules may include, for example: 1) a maximum number of programs that may enter a particular zone; 2) guarantee resource availability to programs in a zone; 3) an instruction, such as shutdown, to defined processes of the service application; and 4) temporary alternation of one or more local application policies. Illustrative embodiments utilize two basic operations on zones: 1) a program entering an application zone; and 2) the program leaving the application zone. A computer program that wants to benefit from this application zone model must explicitly invoke entering and exiting an application zone. In general, application zones are not meant to contain the whole lifetime of a requesting program. Depending on the requesting program's task to be performed by a zone, the program may enter the zone for only a segment of time.

Illustrative embodiments may utilize a zone manager to manage the set of zones in an application. For example, the zone manager may define parameters of each zone in the set of zones for the application and enforce the set of rules corresponding to each zone. The zone manager may be a part of an operating system of the computer. Alternatively, the zone manager may be implemented as an additional component, such as a daemon.

An illustrative embodiment use case example follows: a requesting program on a client wants to enter a zone of a reporting application, which includes a user interface and provides a data import service, on a server. The requesting program wants to utilize a zone labeled "data import," which includes a set of rules, such as, for example: 1) allow only one program to enter the zone; 2) alter local policy of the reporting application to disallow shutdown; 3) guarantee 12 gigabytes of random access memory to the requesting program; and 4) guarantee 90% of available bandwidth to the requesting program. A user of the reporting application may define, via the user interface, an additional set of rules on the application level or the operating system level. At the beginning of the data import process, the requesting program requests entrance into the reporting application zone labeled "data import" and then waits for a notification from the zone manager that the zone is ready for the requesting program to enter. The zone manager ensures that the set of rules are met until the requesting program declares that the requesting program is exiting the zone.

Another illustrative embodiment use case example follows: a requesting program on a client wants to enter a zone of an application that periodically extracts and processes sensitive data. The requesting program wants to utilize a zone of the application labeled "sensitive data processing." The requesting program enters the "sensitive data processing" zone of the application before the zone decrypts the sensitive data and the requesting program exits the zone when all the encrypted sensitive data is disposed from memory. The set of rules for the "sensitive data processing" zone may be, for example: 1) alter local policy of the application disallowing remote connection; 2) terminate program X if running; and 3) alter local policy of the application disallowing input/output writes.

With reference now to FIG. 3, a diagram illustrating an example an application zone management system is depicted in accordance with an illustrative embodiment. Application zone management system 300 may be implemented in a network of data processing systems, such as, for example, network data processing system 100 in FIG. 1.

Application zone management system 300 includes server computer 302 and client device 304. Server computer 302 may be, for example, server 104 in FIG. 1 and data processing system 200 in FIG. 2. Client device 304 may be, for example, client 110 in FIG. 1.

In this example, server computer 302 includes application programming interface 306, zone manager 308, application 310, and dedicated resources 312. Server computer 302 utilizes application programming interface 306 to enable communication between service requesting program 314 on client device 304 and application 310 on server computer 302. Application programming interface may be, for example, application programming interface 220 in FIG. 2, and application 310 may be, for example, application 222 in FIG. 2.

In this example, application 310 includes zone 318, which includes label 320 and set of rules 322, and zone monitoring thread 324. Zone 318 may be, for example, a zone in set of zones 226 in FIG. 2. Label 320 may be, for example, a label in labels 230 in FIG. 2. Set of rules 322 may be, for example, set of rules 232 in FIG. 2. Zone monitoring thread 324 may be, for example, zone monitoring thread 228 in FIG. 2.

Zone manager 308 manages or controls zone 318 using set of rules 322. It should be noted that zone manager 308 may be a separate process or may be part of an operating system of server computer 302. Zone manager 308 communicates with application 310 and service requesting program 314 via an application programming interface 306. In general, service requesting program 314 has the ability to enter zone 318 and exit zone 318. However, zone manager 308 may block service requesting program 314 from entering zone 318 until zone 318 is ready to receive service requesting program 314. Alternatively, zone manager 308 may send service requesting program 314 a zone enter failure notification when zone 318 is not ready to let service requesting program 314 enter (e.g., the maximum number of programs set by set of rules 322 is already in zone 318).

Zone manager 308 waits in an idle loop until zone manager 308 receives zone enter request 316 from service requesting program 314. When zone manager 308 receives zone enter request 316, zone manager 308 calculates parameters of zone 318 based on set of rules 322. Then, zone manager 308 spawns zone monitoring thread 324 to enforce set of rules 322 on zone 318. Alternatively, zone manager 308 may have an already running zone monitoring thread enforce set of rules 322 on zone 318. Afterward, zone manager 308 returns to the idle loop waiting for another zone enter request.

Zone monitoring thread 324 determines whether zone 318 already exists in application 310. If zone 318 does not already exist, then zone monitoring thread 324 prepares all required accessory tasks and probes needed to maintain parameters of zone 318. Subsequently, zone monitoring thread 324 notifies service requesting program 314, via zone enter notification 326, that service requesting program 314 may enter zone 318 to receive the service. If zone 318 already exists in application 310, then zone monitoring thread 324 determines whether a current number of programs in zone 318 exceeds a predetermined threshold number of programs. If not, then zone monitoring thread 324 allows service requesting program 314 to enter zone 318. If so, then zone monitoring thread 324 blocks service requesting program 314 from entering zone 318. So all operations in zone 318 occur between "notify program to enter zone" and "wait for program to exit the zone." When service requesting program 314 wants to leave zone 318, then service requesting program 314 sends zone exit notification 328 to zone manager 308. Afterward, zone manager 308 determines whether service requesting program 314 was the last program to exit zone 318. If so, then zone manager 308 releases zone 318.

Figure 4A:
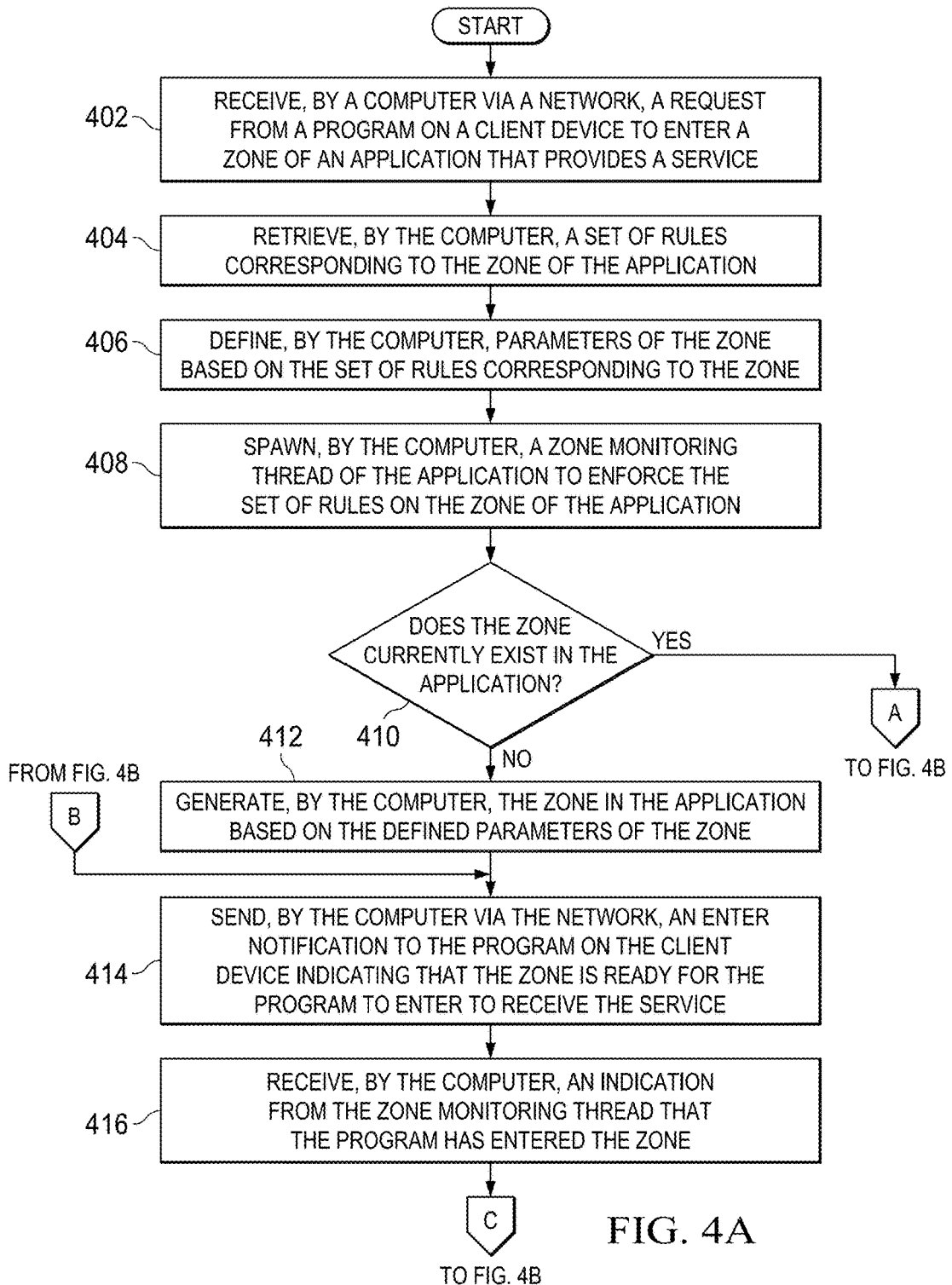
FIGS. 4A-4B are a flowchart illustrating a process for managing an application zone in accordance with an illustrative embodiment.
Figure 4B:
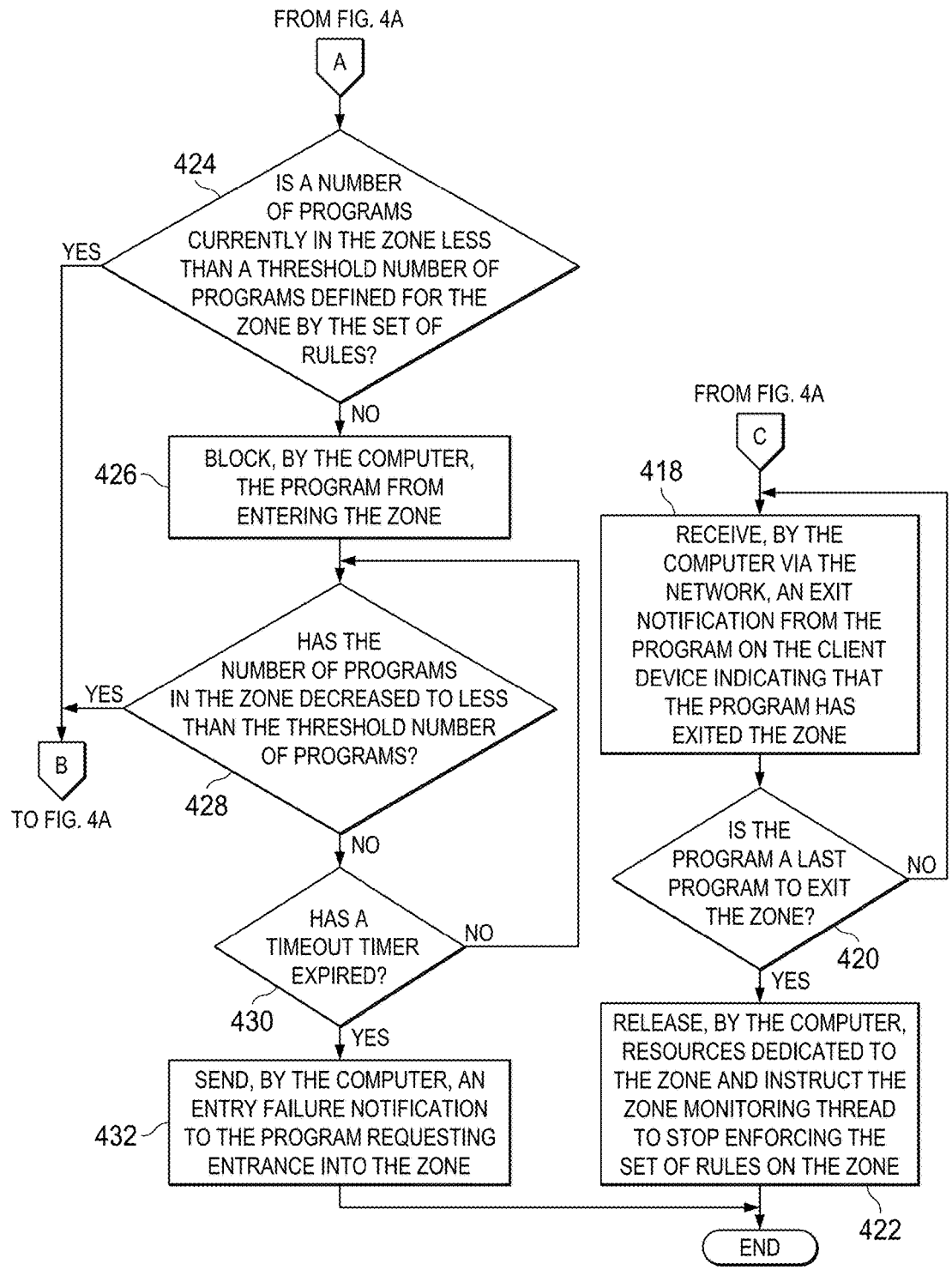

With reference now to FIGS. 4A-4B, a flowchart illustrating a process for managing an application zone is shown in accordance with an illustrative embodiment. The process shown in FIGS. 4A-4B may be implemented in a computer, such as, for example, server 104 in FIG. 1, data processing system 200 in FIG. 2, and server computer 302 in FIG. 3.

The process begins when the computer receives, via a network, a request from a program on a client device to enter a zone of an application that provides a service (step 402). The network may be, for example, network 102 in FIG. 1. The request to enter the zone may be, for example, zone enter request 316 in FIG. 3. The program on the client device may be, for example, service requesting program 314 in FIG. 3. The zone of the application that provides the service may be, for example, zone 318 of application 310 in FIG. 3. In addition, the computer may utilize a zone manager, such as zone manager 308 in FIG. 3, to manage the application zone. Further, the computer may utilize an application programming interface, such as application programming interface 306 in FIG. 3 to implement communication between the program on the client device and the application on the computer.

After receiving the request in step 402, the computer retrieves a set of rules corresponding to the zone of the application (step 404). The set of rules may be, for example, set of rules 322 in FIG. 3. The computer may retrieve the set of rules from a storage device, such as persistent storage 208 in FIG. 2. The computer also defines parameters of the zone based on the set of rules corresponding to the zone (step 406). In addition, the computer spawns a zone monitoring thread of the application to enforce the set of rules on the zone of the application (step 408). The zone monitoring thread may be, for example, zone monitoring thread 324 in FIG. 3.

Subsequently, the computer makes a determination as to whether the zone currently exists in the application (step 410). If the computer determines that the zone does not currently exist in the application, no output of step 410, then the computer generates the zone in the application based on the defined parameters of the zone (step 412). Afterward, the computer sends, via the network, an enter notification to the program on the client device indicating that the zone is ready for the program to enter to receive the service (step 414). The enter notification may be, for example, zone enter notification 326 in FIG. 3.

Subsequently, the computer receives an indication from the zone monitoring thread that the program has entered the zone (step 416). Afterward, the computer receives, via the network, an exit notification from the program on the client device indicating that the program has exited the zone (step 418). The exit notification may be, for example, zone exit notification 328 in FIG. 3.

The computer makes a determination as to whether the program is a last program to exit the zone (step 420). If the computer determines that the program is the last program to exit the zone, yes output of step 420, then the computer releases resources dedicated to the zone and instructs the zone monitoring thread to stop enforcing the set of rules on the zone (step 422). Resources dedicated to the zone may be, for example, dedicated resources 312 in FIG. 3. Thereafter, the process terminates.

Returning again to step 410, if the computer determines that the zone does currently exist in the application, yes output of step 410, then the computer makes a determination as to whether a number of programs currently in the zone is less than a threshold number of programs defined for the zone by the set of rules (step 424). If the computer determines that the number of programs currently in the zone is less than the threshold number of programs defined for the zone by the set of rules, yes output of step 424, then the process returns to step 414 where the computer sends the enter notification to the program. If the computer determines that the number of programs currently in the zone is greater than the threshold number of programs defined for the zone by the set of rules, no output of step 424, then the computer blocks the program from entering the zone (step 426).

Subsequently, the computer makes a determination as to whether the number of programs in the zone has decreased to less than the threshold number of programs (step 428). If the computer determines that the number of programs in the zone has decreased to less than the threshold number of programs, yes output of step 428, then the process returns to step 414 where the computer sends the enter notification to the program. If the computer determines that the number of programs in the zone has not decreased to less than the threshold number of programs, no output of step 428, then the computer makes a determination as to whether a timeout timer expired (step 430). If the computer determines that the timeout timer has not expired, no output of step 430, then the process returns to step 428 where the computer continues to determine whether the number of programs in the zone decreased below the threshold number. If the computer determines that the timeout timer has expired, yes output of step 430, then the computer sends an entry failure notification to the program requesting entrance into the zone (step 432) and the process terminates thereafter.

Thus, illustrative embodiments of the present invention provide a computer-implemented method, computer system, and computer program product for increasing performance of an application in a server computer that provides a service via a network by managing a set of one or more zones in the application using a zone manager. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for managing an application, the computer-implemented method comprising:
    receiving, by a computer, a request from a program on a client device to enter a zone that provides a service, the zone being in an application;
    responsive to the computer determining that the zone does not currently exist in the application, generating, by the computer, the zone based on defined parameters of the zone; and
    sending, by the computer, an enter notification to the program on the client device indicating that the zone is ready for the program to enter to receive the service.

2. The computer-implemented method of claim 1, wherein the zone guarantees availability of dedicated resources to the program.

3. The computer-implemented method of claim 2 further comprising:
    spawning, by the computer, a zone monitoring thread to enforce a set of rules on the zone.

4. The computer-implemented method of claim 3, wherein one of the set of rules is to disallow I/O writes.

5. The computer-implemented method of claim 3, wherein one of the set of rules is to disallow remote connection.

6. The computer-implemented method of claim 3, wherein one of the set of rules is to terminate a program in response to determining that the program is running.

7. The computer-implemented method of claim 2 further comprising:
    retrieving, by the computer, a set of rules corresponding to the zone from a storage device; and
    defining, by the computer, parameters of the zone based on the set of rules corresponding to the zone.

8. The computer-implemented method of claim 2 further comprising:
    receiving, by the computer, an indication from a zone monitoring thread that the program has entered the zone.

9. The computer-implemented method of claim 2 further comprising:
    receiving, by the computer, an exit notification from the program on the client device indicating that the program has exited the zone;
    responsive to the computer determining that the program is a last program to exit the zone, releasing, by the computer, resources dedicated to the zone; and
    instructing, by the computer, a zone monitoring thread to stop enforcing a set of rules on the zone.

10. The computer-implemented method of claim 2 further comprising:
    responsive to the computer determining that a number of programs currently in the zone is greater than a threshold number of programs defined for the zone by a set of rules, blocking, by the computer, the program from entering the zone.

11. The computer-implemented method of claim 10 further comprising:
    determining, by the computer, whether the number of programs in the zone has decreased to less than the threshold number of programs;
    responsive to the computer determining that the number of programs in the zone has decreased to less than the threshold number of programs, sending, by the computer, the enter notification to the program;
    responsive to the computer determining that the number of programs in the zone has not decreased to less than the threshold number of programs, determining, by the computer, whether a timeout timer expired; and
    responsive to the computer determining that the timeout timer has expired, sending, by the computer, an entry failure notification to the program requesting entrance into the zone.

12. The computer-implemented method of claim 2, wherein the computer utilizes a zone manager to manage the zone, and wherein the zone manager is included in an operating system of the computer.

13. The computer-implemented method of claim 2, wherein the zone includes a label, and wherein the program knows the label of the zone, and wherein the program utilizes the label to identify and enter the zone.

14. The computer-implemented method of claim 2, wherein the zone performs a task corresponding to the service.

15. The computer-implemented method of claim 2, wherein the zone is one of a set of zones.

16. A computer system for managing an application, the computer system comprising:
    a bus system;
    a storage device connected to the bus system, wherein the storage device stores program instructions; and
    a processor connected to the bus system, wherein the processor executes the program instructions to:
        receive a request from a program on a client device to enter a zone that provides a service, the zone being in an application;

generate the zone based on defined parameters of the zone in response to determining that the zone does not currently exist in the application; and send an enter notification to the program on the client device indicating that the zone is ready for the program to enter to receive the service.

17. A computer program product for managing an application, the computer program product comprising a computer readable storage medium having program instructions embodied therewith, the program instructions executable by a computer to cause the computer to perform a method comprising:

receiving, by the computer, a request from a program on a client device to enter a zone that provides a service, the zone being in an application;

responsive to the computer determining that the zone does not currently exist in the application, generating, by the computer, the zone based on defined parameters of the zone; and sending, by the computer, an enter notification to the program on the client device indicating that the zone is ready for the program to enter to receive the service.

18. The computer program product of claim 17 further comprising:

spawning, by the computer, a zone monitoring thread to enforce a set of rules on the zone.

19. The computer program product of claim 17 further comprising:

retrieving, by the computer, a set of rules corresponding to the zone from a storage device; and defining, by the computer, parameters of the zone based on the set of rules corresponding to the zone.

20. The computer program product of claim 17 further comprising:

receiving, by the computer, an indication from a zone monitoring thread that the program has entered the zone.

21. The computer program product of claim 17 further comprising:

receiving, by the computer, an exit notification from the program on the client device indicating that the program has exited the zone;

responsive to the computer determining that the program is a last program to exit the zone, releasing, by the computer, resources dedicated to the zone; and instructing, by the computer, a zone monitoring thread to stop enforcing a set of rules on the zone.

22. The computer program product of claim 17 further comprising:

responsive to the computer determining that a number of programs currently in the zone is greater than a threshold number of programs defined for the zone by a set of rules, blocking, by the computer, the program from entering the zone.

23. The computer program product of claim 22 further comprising:

determining, by the computer, whether the number of programs in the zone has decreased to less than the threshold number of programs;

responsive to the computer determining that the number of programs in the zone has decreased to less than the threshold number of programs, sending, by the computer, the enter notification to the program;

responsive to the computer determining that the number of programs in the zone has not decreased to less than the threshold number of programs, determining, by the computer, whether a timeout timer expired; and responsive to the computer determining that the timeout timer has expired, sending, by the computer, an entry failure notification to the program requesting entrance into the zone.

24. The computer program product of claim 17, wherein the computer utilizes a zone manager to manage the zone, and wherein the zone manager is included in an operating system of the computer.

* * * * *